(12) United States Patent
Kim et al.

(10) Patent No.: US 7,420,639 B2
(45) Date of Patent: Sep. 2, 2008

(54) LIQUID CRYSTAL DISPLAY AND A METHOD FOR MANUFACTURING THE SAME

(75) Inventors: Hee-Joon Kim, Yongin-si (KR); Bum-Ki Baek, Suwon-si (KR); Jeong-Young Lee, Yongin-si (KR); Jae-Hong Jeon, Seongnam-si (KR)

(73) Assignee: Samsung Electronics Co, Ltd., Gyeonggi-do (KR)

( * ) Notice: Subject to any disclaimer, the term of this patent is extended or adjusted under 35 U.S.C. 154(b) by 372 days.

(21) Appl. No.: 11/043,175

(22) Filed: Jan. 27, 2005

(65) Prior Publication Data
US 2005/0162596 A1 Jul. 28, 2005

(30) Foreign Application Priority Data
Jan. 28, 2004 (KR) .................. 10-2004-0005407

(51) Int. Cl.
*G02F 1/1337* (2006.01)
(52) U.S. Cl. ................................. 349/129
(58) Field of Classification Search .......... 349/129, 349/143, 130
See application file for complete search history.

(56) References Cited

U.S. PATENT DOCUMENTS

| | | | |
|---|---|---|---|
| 6,573,965 B1 * | 6/2003 | Liu et al. ............. | 349/129 |
| 6,671,020 B2 * | 12/2003 | Kim et al. ............. | 349/129 |
| 6,788,374 B2 * | 9/2004 | Ko et al. ............... | 349/129 |
| 6,873,386 B2 * | 3/2005 | Kim et al. ............. | 349/129 |
| 6,882,393 B2 * | 4/2005 | Kawai et al. .......... | 349/129 |
| 6,927,824 B1 * | 8/2005 | Takeda et al. ........ | 349/129 |
| 2005/0030459 A1 * | 2/2005 | Song et al. ........... | 349/129 |

* cited by examiner

*Primary Examiner*—James A Dudek
(74) *Attorney, Agent, or Firm*—MacPherson Kwok Chen & Heid; Mark Pellegrini

(57) ABSTRACT

A liquid crystal display includes opening patterns in the electrodes or protrusions on the electrodes. The opening patterns or the protrusions have a pattern which controls the direction of the liquid crystal molecules. Thus the quality of the LCD can be improved.

18 Claims, 17 Drawing Sheets

| 단위(μm) | D1 | D2 | W1 | W2 | 2(A1+A2) : 2B+C |
|---|---|---|---|---|---|
| Case 1 | 8 | 8.5 | 6 | 6 | 16.5 : 9 (1:0.55) |
| Case 2 | 6.5 | 7 | 8 | 8 | 13.5 : 9 (1:0.89) |
| Case 3 | 4.5 | 5 | 10 | 10 | 9.5 : 15 (1:1.58) |
| Case 4 | 17.5 | – | 16 | – | 17.5 : 9 (1:0.46) |

LIQUID CRYSTAL DISPLAY AND A METHOD FOR MANUFACTURING THE SAME

CROSS-REFERENCE TO RELATED APPLICATIONS

This application relies for priority upon Korean Patent Application No. 2004-5407 filed on Jan. 28, 2004, the contents of which are herein incorporated by reference in its entirety.

BACKGROUND OF THE INVENTION

1. Field of the Invention

The present invention relates to a liquid crystal display.

2. Description of Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide reference viewing angle that is defined as a viewing angle making the contrast ratio equal to 1:10 or as a limit angle for the inversion in luminance between the grays.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the VA mode LCD has relatively poor lateral visibility compared with front visibility. For example, a patterned VA (PVA) mode LCD having the cutouts shows an image that becomes bright as it goes far from the front, and in the worse case, the luminance difference between high grays vanishes such that the images cannot be perceived.

In addition, the cutouts and the protrusions reduce the aperture ratio. In order to increase the aperture ratio, the size of the pixel electrodes is suggested to be maximized. However, the close distance between the pixel electrodes causes strong lateral electric fields between the pixel electrodes, which dishevels orientations of the LC molecules to yield textures and light leakage, thereby deteriorating display characteristic.

SUMMARY OF THE INVENTION

A liquid crystal display is provided, which includes: a first panel including a first signal line, a second signal line intersecting the first signal line, a thin film transistor connected to the first and the second signal lines, and a pixel electrode connected to the thin film transistor, a second panel including a common electrode facing the pixel electrode, and a vertically aligned liquid crystal layer that is interposed between the pixel electrode and the common electrode and includes first and second regions having different light transmittance.

At least one of the first and the second panels may further include a tilt direction defining member having a singularity.

The first region may face the tilt direction defining member.

The tilt direction defining member may include a cutout or a protrusion formed at the pixel electrode or the common electrode, and the singularity may include a concavity, a convexity, or a disconnection, and in particular, a concave notch provided at the cutout or the protrusion.

The first and the second panels may further include first and second tilt direction defining members having singularities, respectively, which may be alternately arranged.

The first region may face the first and the second tilt direction defining members.

Each of the first and the second tilt direction defining members may include a cutout formed at the pixel electrode or the common electrode, or a protrusion formed on the pixel electrode or the common electrode.

The number of singularities of each of the first and the second tilt direction defining members may be equal to or more than one.

The transmittance of the first region may be higher than about 50% and lower than about 100% of the transmittance of the second region.

The first region may have a planar area equal to or less than a planar area of the second region and higher than about 40% of the planar area of the second region.

Tilt directions of liquid crystal molecules in the first and the second regions may be different.

A liquid crystal display is provided, which includes: a first panel including a first signal line, a second signal line intersecting the first signal line, a thin film transistor connected to the first and the second signal lines, and a pixel electrode connected to the thin film transistor, a second panel including a common electrode facing the pixel electrode, and a vertically aligned liquid crystal layer that is interposed between the pixel electrode and the common electrode and includes first and second regions for displaying images, liquid crystal molecules in the first and the second regions having different tilt angles.

At least one of the first and the second panels may further include a tilt direction defining member having a singularity.

The first region may face the tilt direction defining member.

The tilt direction defining member may include a cutout or a protrusion formed at the pixel electrode or the common electrode, and the singularity may include a concavity, a convexity, or a disconnection provided at the cutout or the protrusion.

The first region may have a light transmittance higher than about 50% and lower than about 100% of a light transmittance of the second region.

The first region may have a planar area equal to or less than a planar area of the second region and higher than about 40% of the planar area of the second region.

DETAILED DESCRIPTION OF EMBODIMENTS

Figure 1:
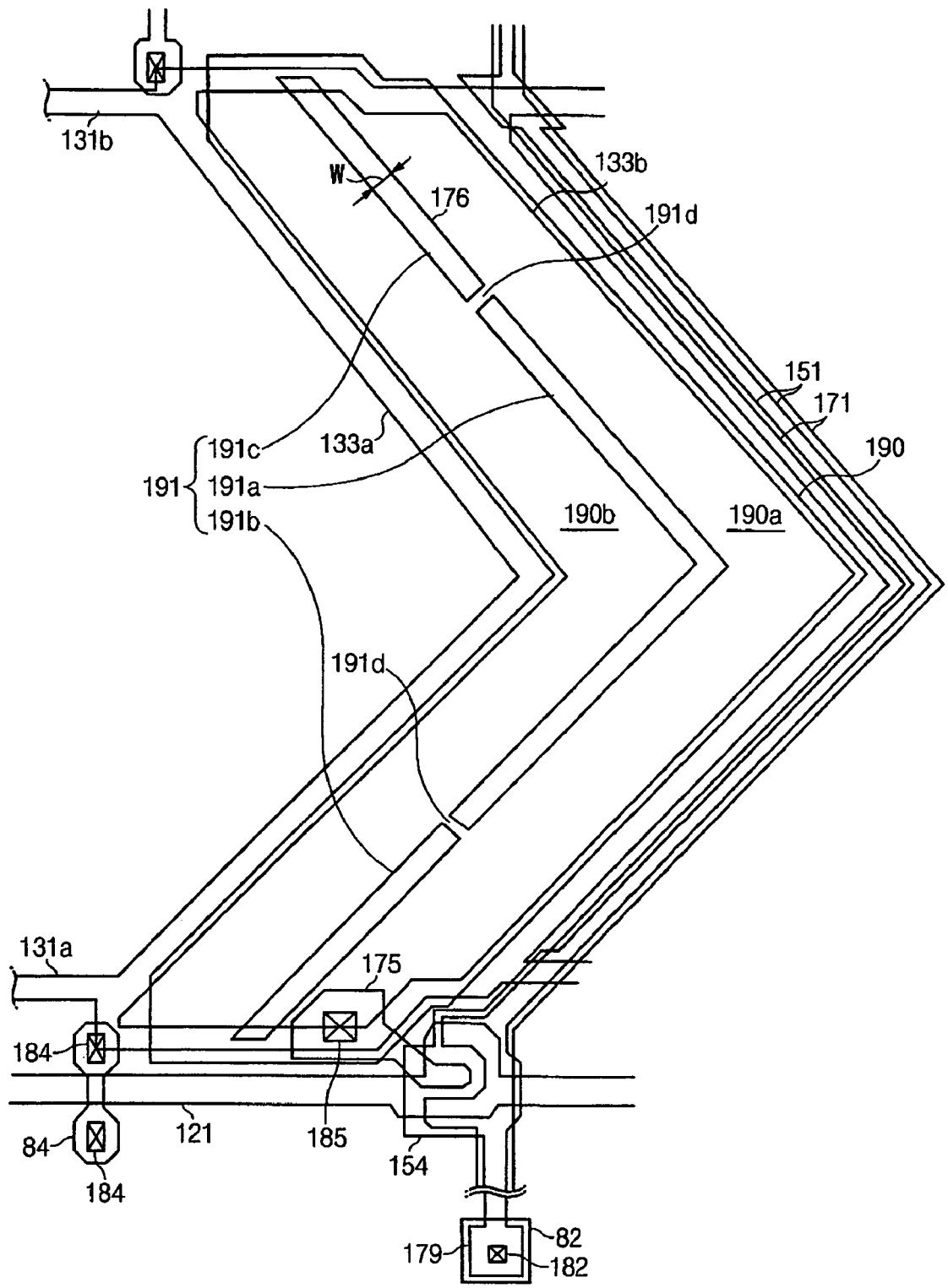
FIG. 1 is a layout view of a pixel area for an LCD according to an embodiment of the present invention.

The present invention will be described hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an embodiment of the present invention is described in detail with reference to FIGS. 1, 2, 3, 4, and 5.

An LCD according to an embodiment of the present invention includes a TFT array panel 100, a common electrode panel 200 facing the TFT array panel 100, and an LC layer 3 interposed between the TFT array panel 100 and the common electrode panel 200.

The TFT array panel 100 is now described in detail with reference to FIGS. 1, 3, 4, and 5.

A plurality of gate lines 121 and a plurality of pairs of storage electrode lines 131a and 131b are formed on an insulating substrate 110.

The gate lines 121 for transmitting gate signals extend substantially in a transverse direction and are separated from each other. Each gate line 121 includes a plurality of projections forming a plurality of gate electrodes 124. The gate lines 121 may extend to be connected to a driving circuit (not shown) integrated on the substrate 110, or it may have an end portion (not shown) having a large area for connection with another layer or an external driving circuit mounted on the substrate 110 or on another device such as a flexible printed circuit film (not shown) that may be attached to the substrate 110.

The storage electrode lines 131a and 131b extend substantially in the transverse direction, but they are bent near the gate electrodes 124. Each pair of the storage electrode lines 131a and 131b include a plurality of pairs of storage electrodes 133a and 133b that are connected thereto and extend parallel to each other. Each storage electrode 133a or 133b is once bent with a substantially right angle such that it includes a pair of oblique portions making an angle of about 45 degrees with the gate lines 121 and connected to each other with a substantially right angle. The storage electrode lines 131a and 131b are supplied with a predetermined voltage such as a common voltage, which is applied to a common electrode 270 on the common electrode panel 200 of the LCD.

The gate lines 121 and the storage electrode lines 131a and 131b are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two films having different physical characteristics. One of the two films is preferably made of low resistivity metal including Al containing metal, Ag containing metal, or Cu containing metal for reducing signal delay or voltage drop in the gate lines 121 and the storage electrode lines 131a and 131b. The other film is preferably made of material such as Cr, Mo, Mo alloy, Ta, or Ti, which has good physical, chemical, and electrical contact characteristics with other materials such as indium tin oxide (ITO) or indium zinc oxide (IZO). A good exemplary combination of the two film materials is Cr and Al—Nd alloy.

In addition, the lateral sides of the gate lines 121 and the storage electrode lines 131a and 131b are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131a and 131b.

A plurality of semiconductor stripes 151 preferably made of hydrogenated amorphous silicon (abbreviated as "a-Si") or polysilicon are formed on the gate insulating layer 140. Each semiconductor stripe 151 extends substantially parallel to the storage electrodes 133a and 133b such that it is bent periodically. Each semiconductor stripe 151 has a plurality of projections 154 branched out toward the gate electrodes 124 and the width of each semiconductor stripe 151 becomes large near the gate lines 121 and the storage electrode lines 131a and 131b such that the semiconductor stripe 151 covers large areas of the gate lines 121 and the storage electrode lines 131a and 131b.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range of about 30-80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131a and 131b. Each data line 171 has an end portion 179 having a large area for contact with another layer or an external device and it includes a plurality of oblique portions and a plurality of longitudinal portions such that it bends periodically. Each bent portion connects a pair of oblique portions to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124. The length of the oblique portion is about one to nine times the length of the longitudinal portion, that is, it occupies about 50-90 percents of the total length of the data line. An oblique portion may have three or more sub-oblique portions in a pixel area such that it is bent twice or more in a pixel area.

Each drain electrode 175 obliquely extends from a linear end portion disposed near a gate electrode 124 to a rectangular expanded end portion having a large area for contact with another layer. The expansion of the drain electrode 175 has a chamfered corner substantially parallel to the storage electrodes 133a and 133b. Each longitudinal portion of the data lines 171 includes a plurality of projections such that the longitudinal portion including the projections forms a source electrode 173 partly enclosing a linear end portion of a drain electrode 175. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

The data lines 171 and the drain electrodes 175 are preferably made of refractory metal such as Cr, Mo, Mo alloy, Ta and Ti. They may also include a lower film (not shown) preferably made of Mo, Mo alloy or Cr and an upper film (not shown) located thereon and preferably made of Al containing metal.

Like the gate lines 121 and the storage electrode lines 131a and 131b, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 and the storage electrode lines 131a and 131b as described above, to smooth the profile of the surface, thereby preventing the disconnection of the data lines 171.

A passivation layer 180 is formed on the data lines 171 and the drain electrodes 175, and exposed portions of the semiconductor stripes 151, which are not covered with the data lines 171 and the drain electrodes 175. The passivation layer 180 is preferably made of low dielectric insulating material such as a-Si:C:O and a-Si:O:F formed by plasma enhanced chemical vapor deposition (PECVD), organic insulator or inorganic insulator such as silicon nitride and silicon oxide.

The passivation layer 180 may have a double-layered structure including a lower inorganic film and an upper organic film in order to prevent the channel portions of the semiconductor stripes 151 from being in direct contact with organic material.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 184 exposing the storage electrode lines 131a and 131b. The contact holes 182, 184 and 185 can have various shapes such as polygon or circle. The sidewalls of the contact holes 182, 184 and 185 are inclined with an angle of about 30-85 degrees or have stepwise profiles.

A plurality of pixel electrodes 190, a plurality of contact assistants 82, and a plurality of storage overpasses 84 are formed on the passivation layer 180, and they are preferably made of ITO or IZO.

Each pixel electrode 190 is located substantially in an area enclosed by the data lines 171 and the gate lines 121, and it has a pair of transverse edges extending substantially parallel to the storage electrode lines 131a and 131b and a pair of bent edges substantially parallel to the data lines 171 such that it also forms a chevron. The pixel electrodes 190 overlap the storage electrode lines 131a and 131b including the storage electrodes 133a and 133b and the expansions of the drain electrodes 175.

In addition, each pixel electrode 190 has a bent cutout 191 that extends substantially parallel to the bent edges of the pixel electrode 190 and bisecting the pixel electrode 190 into right part 190a and left part 190b. The cutout 191 is divided into middle portion 191a, lower portion 191b, and upper portion 191c by a pair of bridges 191d disposed at about quarter points of the cutout 191 from top and bottom of the cutout 191. The bridges 191d cross the cutout 191 perpendicularly to the cutout 191 and thus each of the portions 191a, 191b, and 191c has two oblique major edges parallel to each other and at least one minor edge perpendicular to the major edges. The width of the cutout 191 preferably ranges about 5-20 microns and the bridges 191d may have a shape of notch, triangle, parallelogram, or semicircle.

The pixel electrodes 190 are physically and electrically connected to the drain electrodes 175 through the contact holes 185 such that the pixel electrodes 190 receive the data voltages from the drain electrodes 175. The pixel electrodes 190 supplied with the data voltages generate electric fields in cooperation with the common electrode 270, which reorient liquid crystal molecules 310 disposed therebetween.

A pixel electrode 190 and the common electrode 270 form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131a and 131b including the storage electrodes 133a and 133b.

The pixel electrodes 190 overlap the data lines 171 as well as the gate lines 121 to increase aperture ratio.

The contact assistants 82 are connected to the exposed end portions 179 of the data lines 171 through the contact holes 182. The contact assistants 82 protect the exposed end portions 179 and complement the adhesion between the exposed end portions 179 and external devices. The contact assistants 82 may be omitted when the end portions 179 are omitted.

The storage overpasses 84 cross over the gate lines 121 and they are connected to a pair of the storage electrode lines 131 through the contact holes 184 disposed opposite each other with respect to the gate lines 121.

Finally, a homeotropic alignment layer 11 is formed on the pixel electrodes 190, the contact assistants 82, the storage overpasses 84, and the passivation layer 180.

Figure 2:
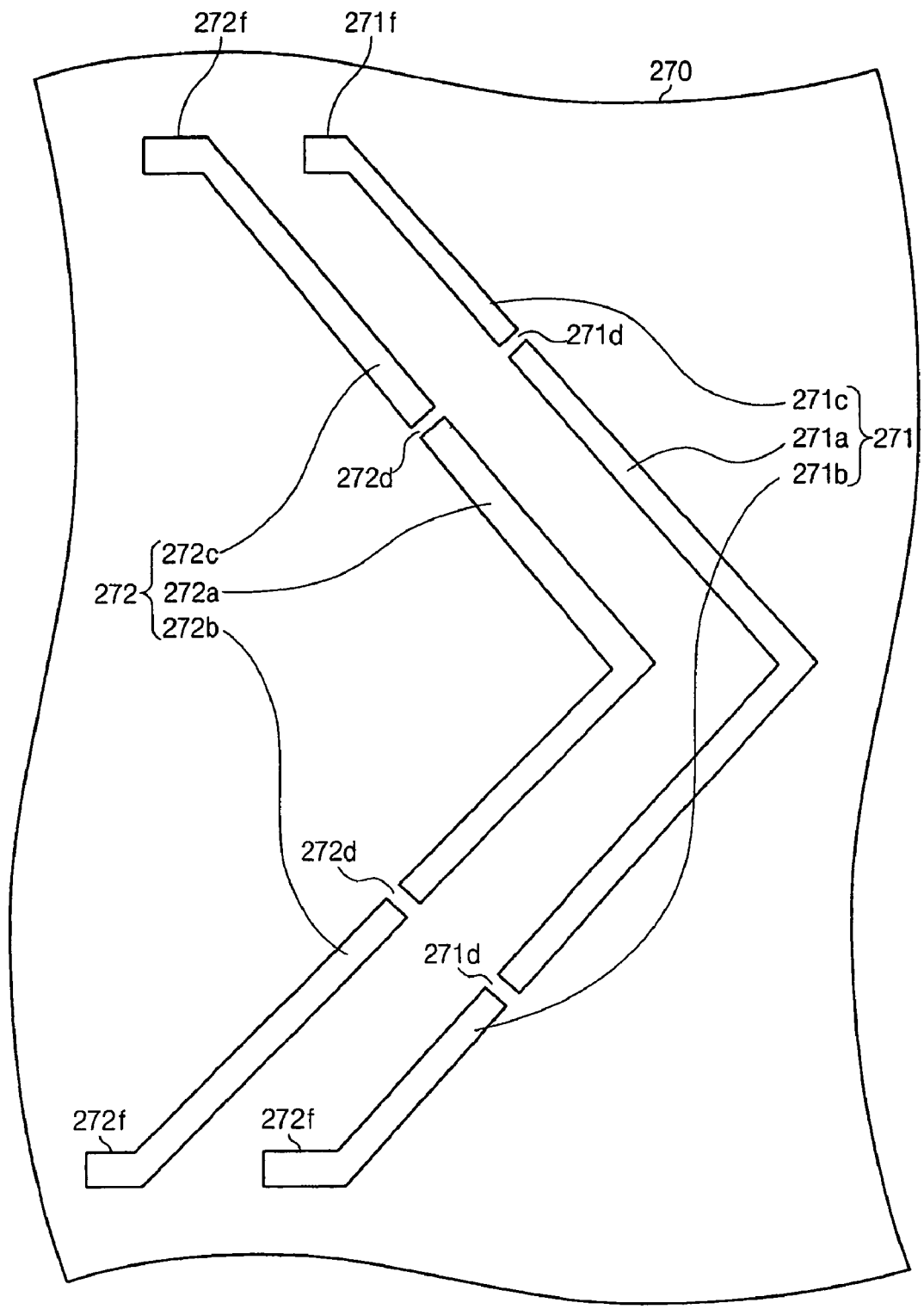
FIG. 2 is a layout view of a common electrode panel for an LCD according to an embodiment of the present invention.
Figure 3:
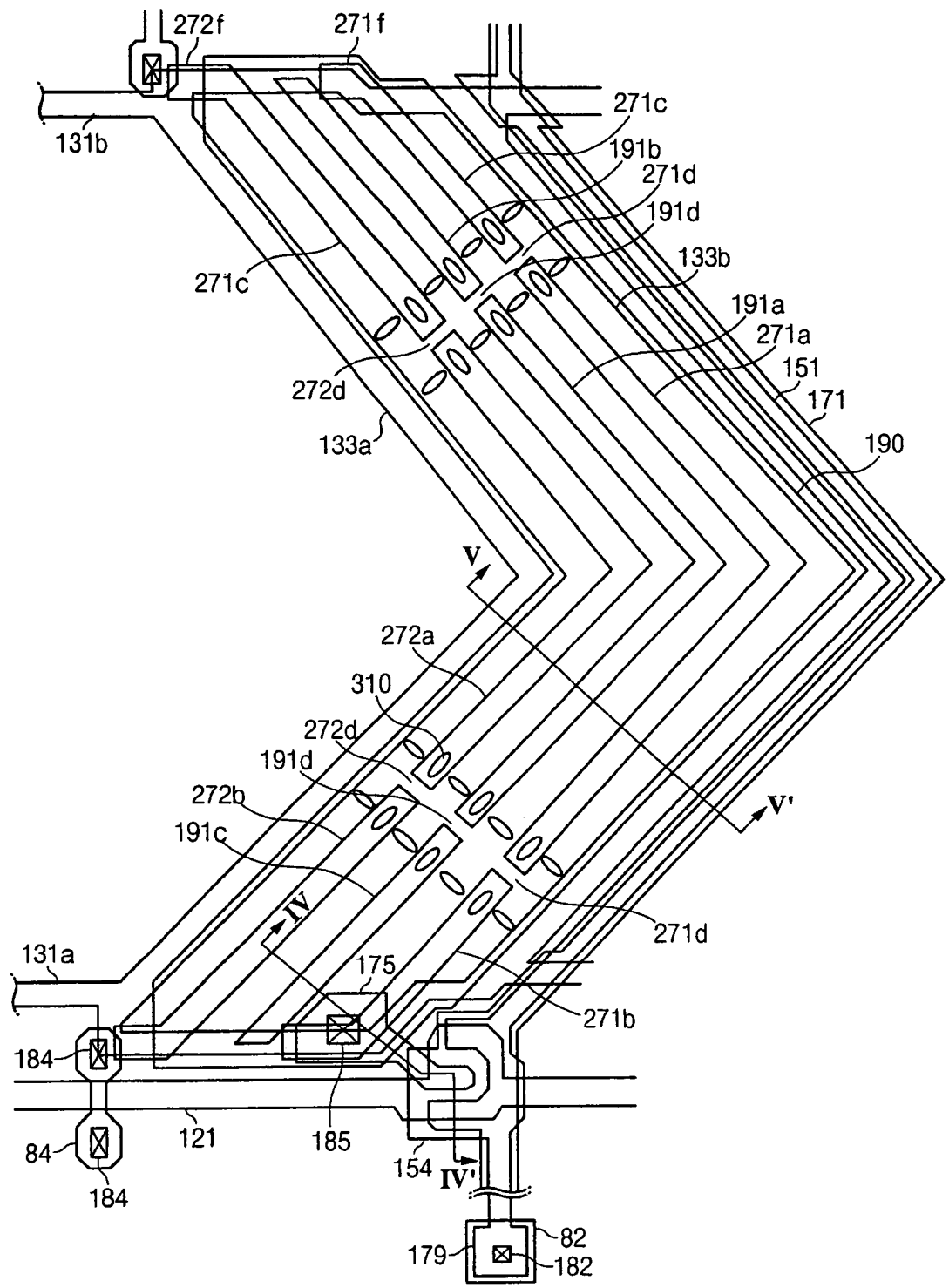
FIG. 3 is a layout view of an LCD including the TFT array panel shown in FIG. 1 and the common electrode panel shown in FIG. 2.
Figure 4:
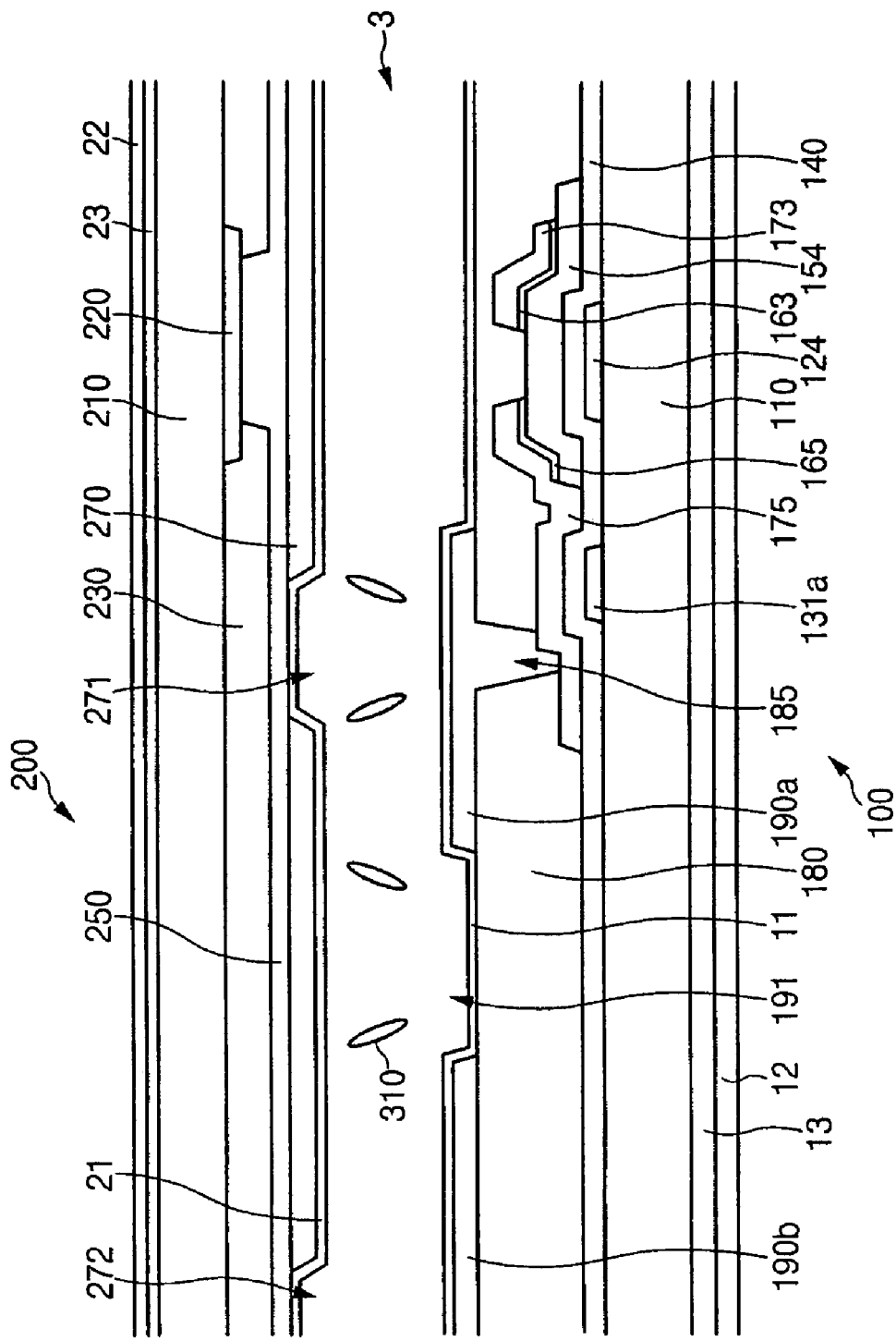
FIG. 4 is the sectional view of the LCD shown in FIG. 3 taken along the line IV-IV'.
Figure 5:
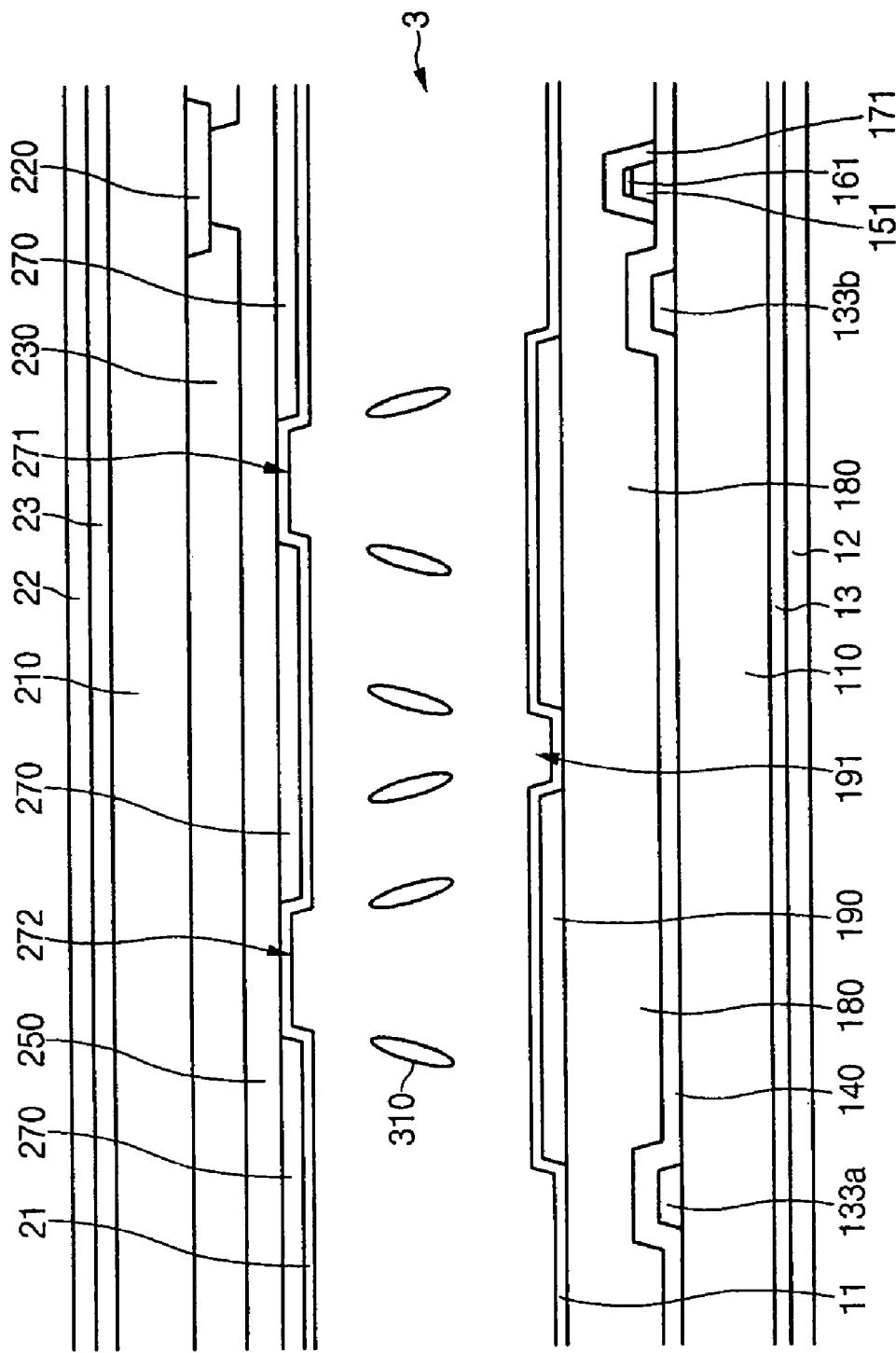
FIG. 5 is the sectional view of the LCD shown in FIG. 3 taken along the line V-V', respectively.

The description of the common electrode panel 200 follows with reference to FIGS. 2, 3, and 4.

A light blocking member 220 called a black matrix is formed on an insulating substrate 210 such as transparent glass and it may include a plurality of bent portions facing the bent portions of the data lines 171 and a plurality of expanded portions facing the TFTs and the longitudinal portions of the data lines 171 such that the light blocking member 220 prevents light leakage between the pixel electrodes 190 and defines open areas facing the pixel electrodes 190.

A plurality of color filters 230 are formed on the substrate 210 and the light blocking member 220 and each of the color filters 230 is disposed substantially in the open areas defined by the light blocking member 220. The color filters 230 disposed between adjacent two data lines 171 and arranged in the longitudinal direction may be connected to each other to form a stripe. Each color filter 230 may represent one of three primary colors such as red, green and blue colors. The color filters 230 may be disposed on the TFT array panel 100, and in this case, they may be disposed under the gate insulating layer 140 or under the passivation layer 180.

An overcoat 250 preferably made of silicon nitride or organic material is formed on the color filters 230 and the light blocking member 220. The overcoat 250 protects the color filters 230 and gives a flat top surface.

A common electrode 270 preferably made of transparent conductive material such as ITO and IZO is formed on the overcoat 250. The common electrode 270 is supplied with the common voltage and it has a plurality of pairs of chevron-like cutouts 271 and 272 facing respective pixel electrodes 190. Each cutout 271 and 272 is divided into middle portions 271a and 272a, lower portions 271b and 272b, and upper portions 271c and 272c by a pair of bridges 271d and 272d disposed at about quarter points from the top to the bottom of the cutout 271 and 272 and the bridges 271d and 272d cross the cutout 271 and 272 perpendicular to the cutout 271 and 272 such that each of the portions 271a, 271b, 271c, 272a, 272b, and 272c has two oblique major edges parallel to each other and at least a minor edge perpendicular to the major edges. In the meantime, the cutout 271 and 272 includes a pair of oblique portions connected to each other and a pair of transverse portions 271f and 272f connected to one of the oblique portions. The oblique portions of the cutout 271 and 272 extend substantially parallel to the cutout 191 of the pixel electrode 190 and they may bisect the partitions of the pixel electrode 190 into left and right halves. The transverse portions 271f and 272f of the cutout 271 and 272 are aligned with transverse edges of the pixel electrode 190, respectively, and they make obtuse angles with the oblique portions of the cutout 271 and 272. The cutout 271 and 272 preferably has a width W in a range of about 6-20 microns.

The light blocking member 220 may also overlap the cutouts 271 and 272 to block the light leakage through the cutouts 271 and 272.

A homeotropic alignment layer 21 is coated on the common electrode 270.

The alignment layers 11 and 21 may be homogeneous alignment layers.

A pair of polarizer 12 and 22 is provided on outer surfaces of the panels 100 and 200 such that their transmissive axes are crossed and one of the transmissive axes is parallel to the gate lines 121. In addition, retardation films 13 and 23 for compensating the retardation of the LC layer 3 are disposed on the outer surfaces of the panels 100 and 200.

The LCD may further include a backlight unit for providing light for the LCD.

The LC layer 3 has negative dielectric anisotropy and the LC molecules 310 in the LC layer 3 are aligned such that their long axes are vertical to the surfaces of the panels 100 and 200 in absence of electric field.

Upon application of the common voltage to the common electrode 270 and a data voltage to the pixel electrodes 190, a primary electric field substantially perpendicular to the surfaces of the panels 100 and 200 is generated. The LC molecules 310 tend to change their orientations in response to the electric field such that their long axes are perpendicular to the field direction. In the meantime, the cutouts 191, 271 and 272 of the pixel electrodes 190 and the common electrode 270 and the edges of the pixel electrodes 190 distort the primary electric field to have a horizontal component which determines the tilt directions of the LC molecules 310. The horizontal component of the primary electric field is perpendicular to the edges of the cutouts 191, 271 and 272 and the edges of the pixel electrodes 190. The horizontal component of the primary field varies depending on positions on a pixel electrode 190.

A pixel region that is defined as a portion of the LC layer 3 disposed on a pixel electrode 190 includes two different kinds of sub-regions. One kind of the sub-regions are those disposed between adjacent two of a set of the cutouts 191, 271 and 272 (referred to as primary sub-regions hereinafter) and the edges of the pixel electrodes 190 and the other kind of the sub-regions are those disposed on the cutouts 191, 271 and 272 (referred to as secondary sub-regions hereinafter).

The horizontal component of the primary electric field in the primary sub-regions is substantially perpendicular to the extension direction of the cutouts 191, 271 and 272 and the edges of the pixel electrodes 190. Accordingly, the primary sub-regions include eight primary domains, each domain including substantially the same tilt direction, and the primary domains are partitioned by the edges of the pixel electrode 190, the set of the cutouts 191, 271 and 272 quartering the pixel electrode 190, and an imaginary transverse center line passing through the meeting point of the oblique portions of the cutouts 191, 271 and 272. The primary domains have four tilt directions.

The horizontal component of the primary electric field in the secondary sub-regions is substantially parallel to the extension directions of the cutouts 191, 271 and 272 since the horizontal components generated by the major edges of each of the cutouts 191, 271 and 272 on the secondary sub-regions point opposite directions to be cancelled. Accordingly, the liquid crystal molecules 310 on the secondary sub-regions are tilted parallel to the extending directions of the cutouts 191, 271 and 272 to form a plurality of secondary domains.

In the meantime, the horizontal component on the secondary domains is relatively weak compared with that on the primary domains. Accordingly, the tilt angle of the secondary domains is different from that of the primary domains, and light transmittances in the primary and the secondary domains are different. In other words, the primary domains exhibit a regular light transmittance corresponding to a given gray, while the secondary domains exhibit a light transmittance slightly different from the regular transmittance. Such a mixed transmittance of a pixel region compensates the distortion of a lateral gamma curve with respect to a front gamma curve, thereby improving visibility of the LCD.

The transmittance of the secondary domains is preferably about 50-100% of that of the primary domains, and the area or the width of the secondary domains is preferably about 40-100% of that of the primary domains.

The transmittance of the secondary domains can be adjusted by varying shapes, angles, or numbers of the bridges 191d, 271d and 272d or width of the cutouts 191, 271 and 272. In addition, the transmittance of the secondary domains may be made different depending on the color represented by the pixel regions.

The change of the shapes, angles, or numbers of the bridges 191d, 271d and 272d or the width of the cutouts 191, 271 and 272 can be also made for effective alignment of the liquid crystal molecules in the second domains or increasing the improvement of the visibility.

In the meantime, the direction of a secondary electric field due to the voltage difference between the pixel electrodes 190 is perpendicular to the edges of the pixel electrodes and the cutouts 191, 271 and 272. Accordingly, the field direction of the secondary electric field coincides with that of the horizontal component of the primary electric field in the primary domains. Consequently, the secondary electric field between the pixel electrodes 190 enhances the determination of the tilt directions of the LC molecules 310 in the primary domains.

Since the LCD performs inversion such as dot inversion, column inversion, etc., adjacent pixel electrodes are supplied with data voltages having opposite polarity with respect to the common voltage and thus a secondary electric field between the adjacent pixel electrodes is almost always generated to enhance the stability of the primary domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

The number, shapes, and arrangements of the cutouts 191, 271 and 272 may be modified depending on the design factors. Moreover, the cutouts 191, 271 and 272 may be substituted with protrusions, preferably made of organic material, and preferably having width ranging about 5-15 microns.

An LCD according to another embodiment of the present invention will be described in detail with reference to FIGS. 6, 7 and 8.

Figure 6:
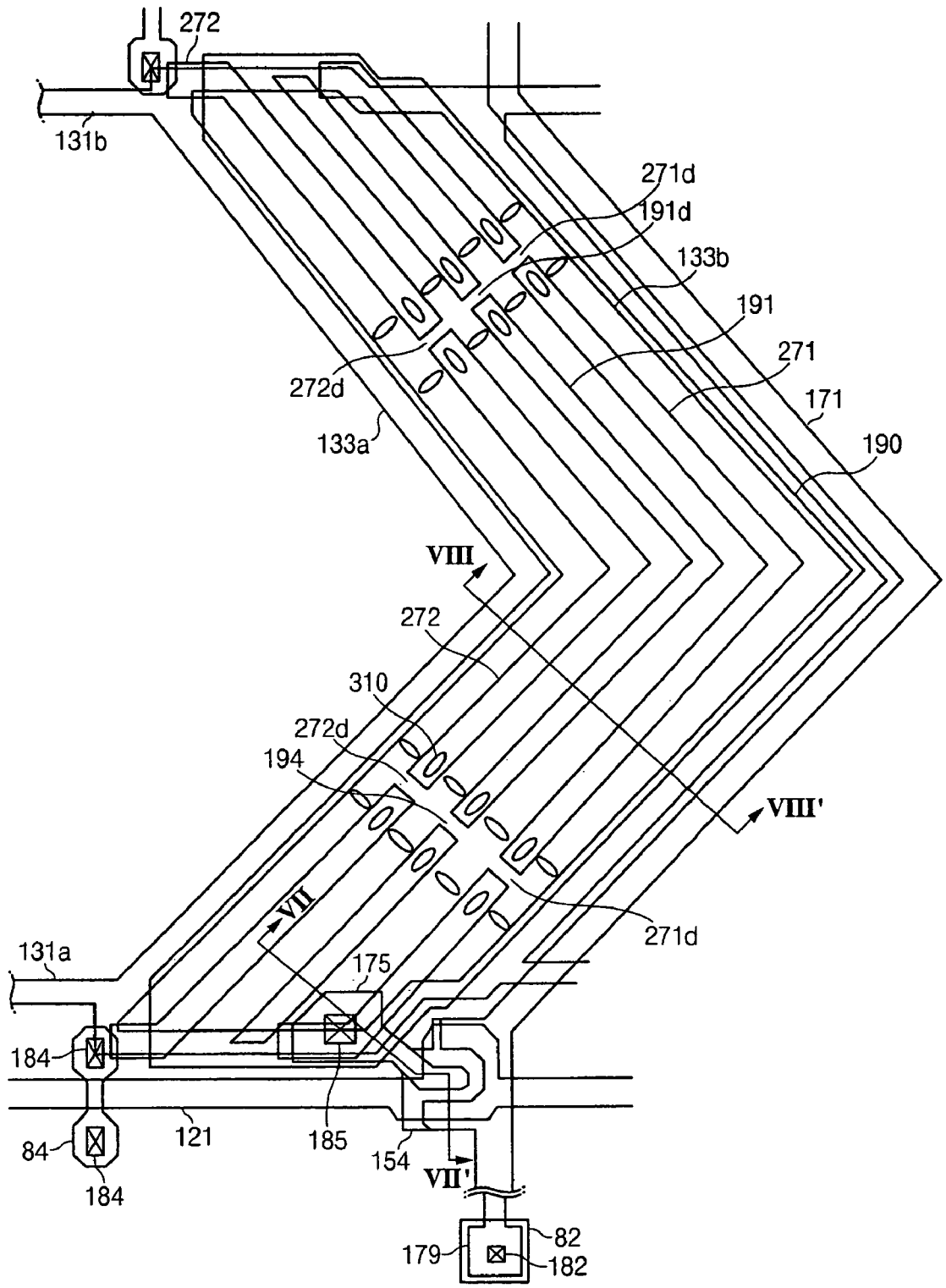
FIG. 6 is a layout view of an LCD according to another embodiment of the present invention.
Figure 7:
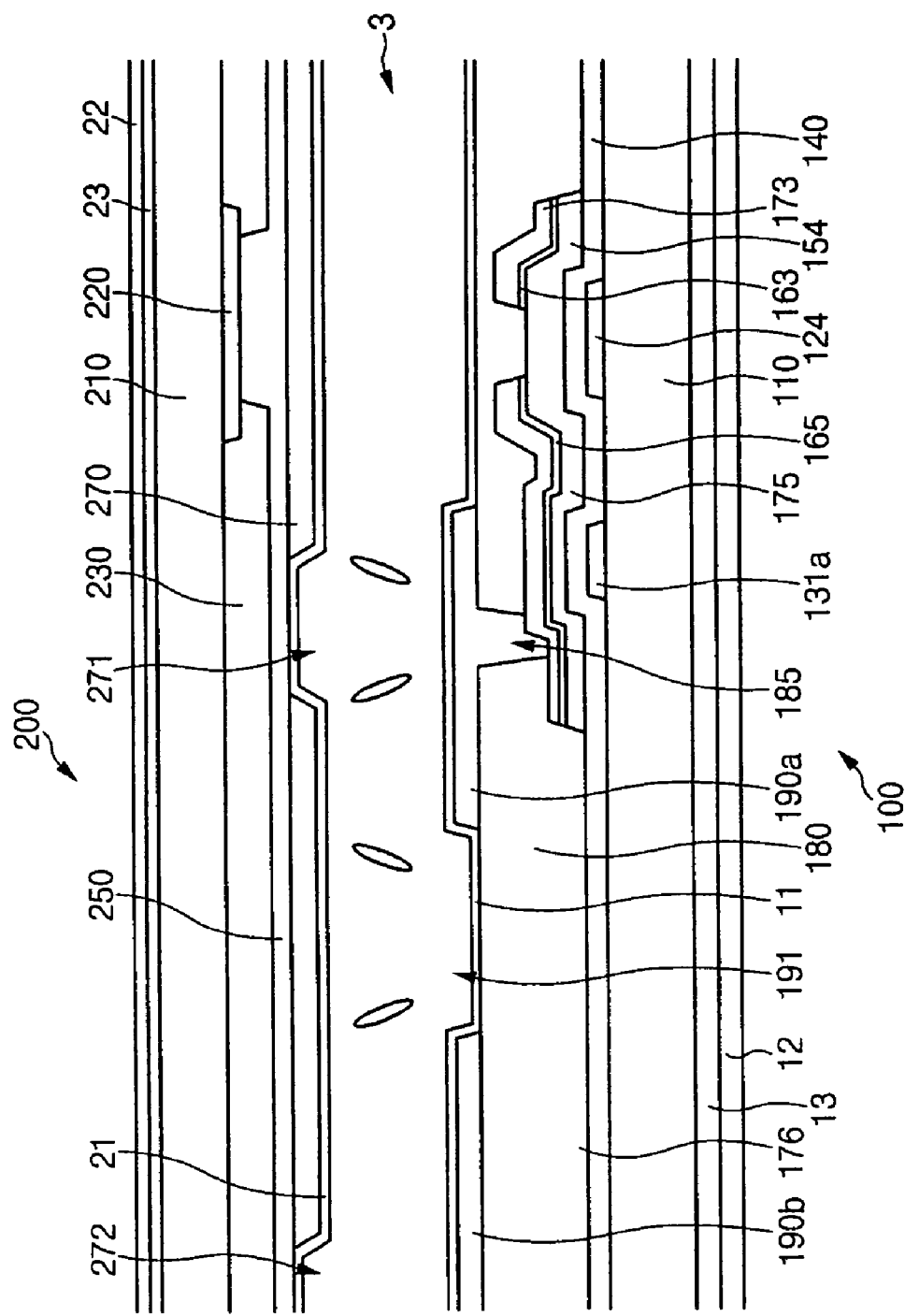
FIG. 7 is a sectional view of the LCD shown in FIG. 6 taken along the line VII-VII'.
Figure 8:
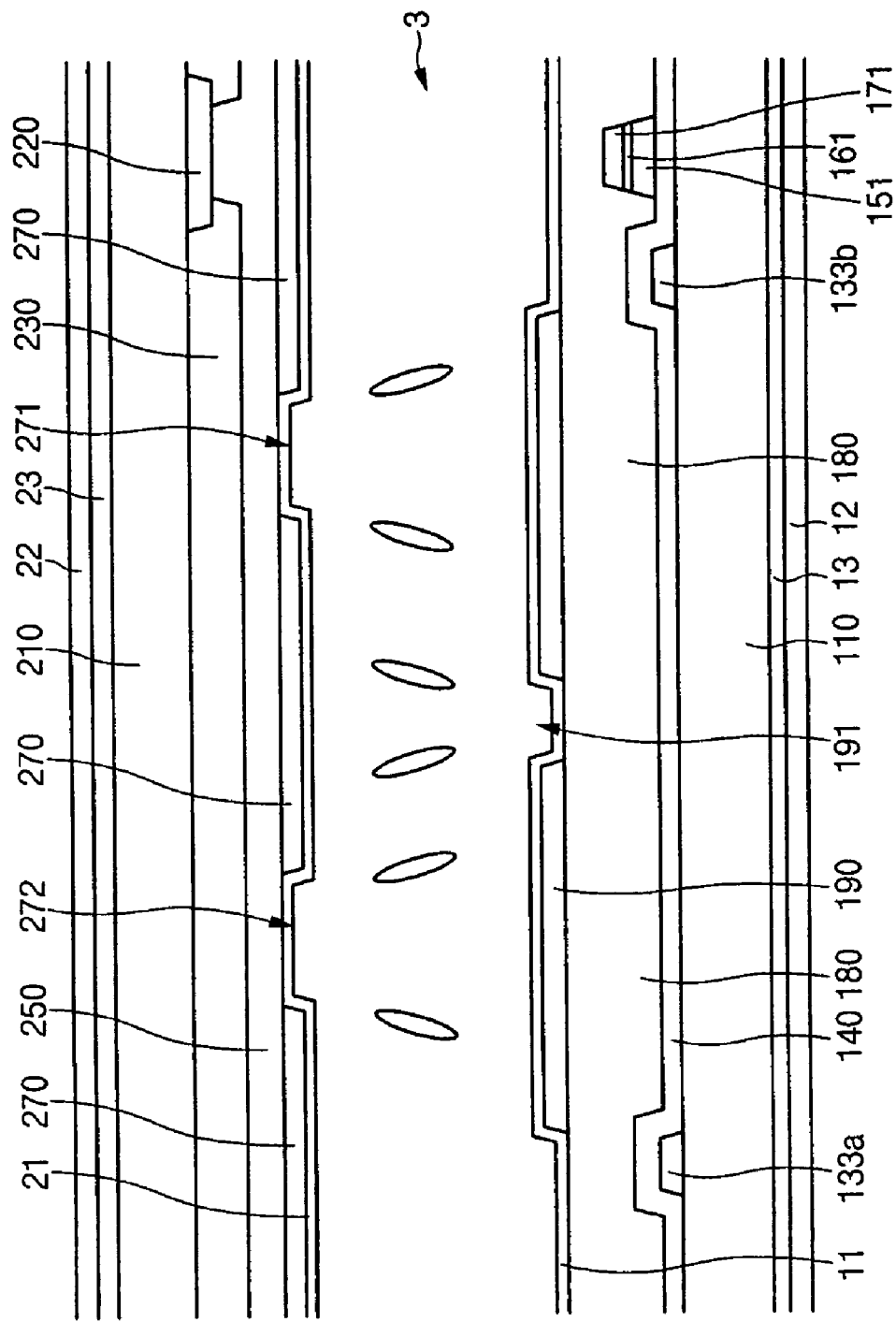
FIG. 8 is a sectional view of the LCD shown in FIG. 6 taken along the lines VIII-VIII' and VIII'-VIII".

Referring to FIGS. 6-8, an LCD according to this embodiment also includes a TFT array panel 100, a common electrode panel 200, and a LC layer 3 interposed therebetween.

Layered structures of the panels 100 and 200 according to this embodiment are almost the same as those shown in FIGS. 1, 2, 3, 4, and 5.

Regarding the TFT array panel 100, a plurality of gate lines 121 including a plurality of gate electrodes 124 and a plurality of storage electrode lines 131a and 131b including a plurality of storage electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 182, 184 and 185 are provided at the passivation layer 180 and the gate insulating layer 140. A plurality of pixel electrodes 190 having cutouts 191 divided by bridges 191d, a plurality of storage overpasses 84, and a plurality of contact assistants 82 are formed on the passivation layer 180 and an alignment layer 11 is coated thereon.

Regarding the common electrode panel 200, a light blocking member 220, a plurality of color filters 230, an overcoat 250, a common electrode 270 having cutouts 271 and 272 divided by bridges 271d and 272d, and an alignment layer 21 are formed on an insulating substrate 210.

Different from the LCD shown in FIGS. 1, 2, 3, 4, and 5, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171, the drain electrodes 175, the semiconductors 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171 and the drain electrodes 175 and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1, 2, 3, 4, and 5 may be appropriate to the LCD shown in FIGS. 6, 7 and 8.

An LCD according to another embodiment of the present invention will be described in detail with reference to FIGS. 9, 10, 11, and 12.

An LCD according to this embodiment includes a TFT array panel 100, a common electrode panel 200, and a LC layer 3 interposed between the panels 100 and 200 and containing a plurality of LC molecules 310 aligned substantially vertical to surfaces of the panels 100 and 200.

Figure 9:
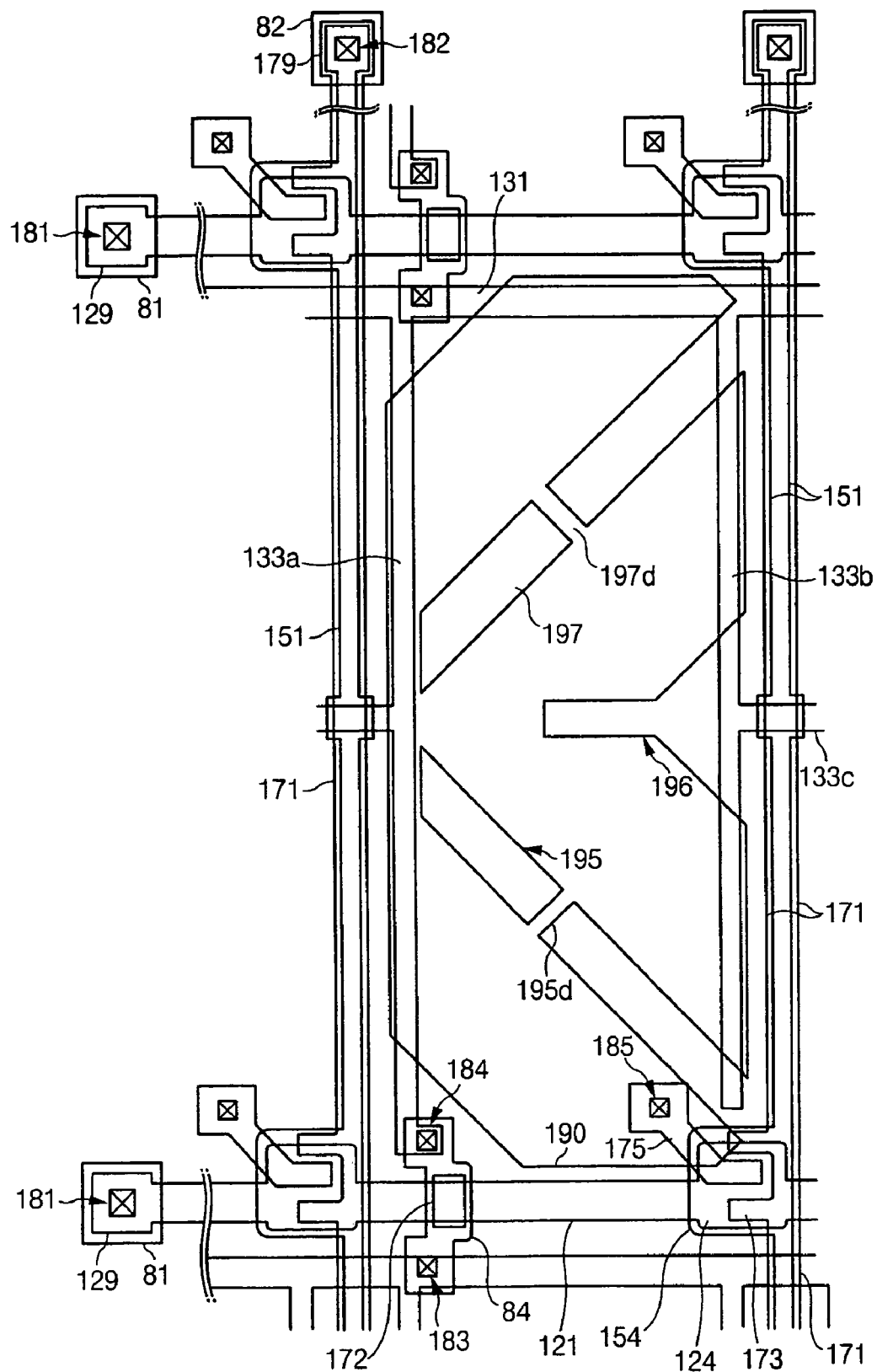
FIG. 9 is a layout view of a TFT array panel of an LCD according to another embodiment of the present invention.

The TFT array panel 100 is now described in detail with reference FIGS. 9, 11 and 12.

A plurality of gate lines 121 and a plurality of storage electrode lines 131 are formed on an insulating substrate 110 such as transparent glass.

The gate lines 121 extend substantially in a transverse direction and are separated from each other and transmit gate signals. Each gate line 121 includes a plurality of projections forming a plurality of gate electrodes 124 and an end portion 129 having a large area for contact with another layer or an external device.

Each storage electrode line 131 extends substantially in the transverse direction and includes a plurality of pairs of two longitudinal branches forming first and second storage electrodes 133a and 133b and a plurality of storage connections 133c connected between the first storage electrodes 133a and the second storage electrodes 133b in adjacent storage electrode pairs. Each of the first storage electrodes 133a has a free end portion and a fixed end portion connected to the storage electrode line 131, and the fixed end portion has a projection. The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction.

The gate lines 121 and the storage electrode lines 131 is preferably made of Al containing metal, Ag containing metal, Cu containing metal, Mo containing metal, Cr, Ti or Ta.

In addition, the lateral sides of the gate lines 121 and the storage electrode lines 131 are inclined relative to a surface of the substrate, and the inclination angle thereof ranges about 20-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124. The width of each semiconductor stripe 151 becomes large near the gate lines 121 and the storage connections 133c such that the semiconductor stripe 151 covers large areas of the gate lines 121 and the storage connections 133c.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range of about 30-80 degrees.

A plurality of data lines 171, a plurality of drain electrodes 175 separated from the data lines 171, and a plurality of isolated metal pieces 172 are formed on the ohmic contacts 161 and 165 and the gate insulating layer 140.

The data lines 171 for transmitting data voltages extend substantially in the longitudinal direction and intersect the gate lines 121, the storage electrode lines 131, and the storage connections 133c. Each data line 171 includes an end portion 179 having a large area for contact with another layer or an external device. A plurality of branches of each data line 171, which project toward the drain electrodes 175, form a plurality of source electrodes 173. Each drain electrode 175 includes an end portion having a large area for contact with another layer and each source electrode 173 is curved to partly enclose another end portion of the drain electrode 175. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The metal pieces 172 are disposed on the gate lines 121 near the end portions of the storage electrodes 133a.

The data lines 171, the drain electrodes 175, and the metal pieces 172 are preferably made of refractory metal such as Cr, Mo containing metal, Ta and Ti and they may also have a multilayered structure including a lower film (not shown) preferably made of Mo, Mo alloy or Cr and an upper film (not shown) located thereon and preferably made of Al containing metal.

Like the gate lines 121 and the storage electrode lines 131, the data lines 171 and the drain electrodes 175 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 and the storage connections 133c as described above, to smooth the profile of the surface, thereby preventing the disconnection of the data lines 171.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si:O:F formed by plasma enhanced chemical vapor deposition (PECVD), or inorganic material such as silicon nitride.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181, 183 and 184 exposing the end portions 129 of the gate lines 121, portions of the storage electrode lines 131 near the fixed end portions of the first storage electrodes 133a, and the projections of the free end portions of the first storage electrodes 133a, respectively. The contact holes 181, 182, 183, 184, and 185 have a shape of polygon or a circle, and sidewalls of the contact holes 181, 182, 183, 184, and 185 are tapered.

A plurality of pixel electrodes 190, a plurality of contact assistants 81 and 82, and a plurality of storage overpasses 84, which are preferably made of ITO or IZO, are formed on the passivation layer 180.

The pixel electrodes 190 are physically and electrically connected to the drain electrodes 175 through the contact holes 185 such that the pixel electrodes 190 receive the data voltages from the drain electrodes 175. The pixel electrodes 190 overlap the storage electrode lines 131 including the storage electrodes 133a and 133b to form storage capacitors.

Each pixel electrode 190 is chamfered at its left corners and the chamfered edges of the pixel electrode 190 make an angle of about 45 degrees with the gate lines 121.

Each pixel electrode 190 has a lower cutout 195, a center cutout 196, and an upper cutout 197, which partition the pixel electrode 190 into a plurality of partitions. The cutouts 195, 196 and 197 substantially have inversion symmetry with respect to an imaginary transverse center line.

The lower cutout 195 and the upper cutout 197 are disposed at lower half and upper half of the pixel electrode 190, respectively, which can be divided by the imaginary center line, and the lower cutout 195 and the upper cutout 197 obliquely extend approximately from the left edge of the pixel electrode 190 approximately to a lower right corner and the upper right corner of the pixel electrode 190. The lower cutout 195 and the upper cutout 197 make counterclockwise or clockwise angles of about 45 degrees to the gate lines 121, and they may be connected to each other. Each of the lower cutout 195 and the upper cutout 197 is divided into two portions by a bridge 195d or 197d. The bridges 195d and 197d cross the cutout 195 and 197 perpendicularly to the cutout 195 and 197. Thus each of the divided portions has two oblique major edges parallel to each other and at least a minor edge perpendicular to the major edges.

The center cutout 196 extends along the imaginary center line and has an inlet from the right edge of the pixel electrode 190, which has a pair of inclined edges substantially parallel to the lower cutout 195 and the upper cutout 197, respectively.

Accordingly, the lower half of the pixel electrode 190 is partitioned into two lower parts by the lower cutout 195 and the upper half of the pixel electrode 190 is also partitioned into two upper parts by the upper cutout 197. The number of parts or the number of the cutouts depends on the design factors such as the size of pixels, the ratio of the transverse edges and the longitudinal edges of the pixel electrodes 190, the type and characteristics of the liquid crystal layer 3, and so on.

The contact assistant 81 is connected to the end portion 129 of the gate line 121 through the contact hole 181. The contact assistant 82 is connected to the end portion 179 of the data lines 171 through the contact hole 182. The contact assistants 81 and 82 protect the end portions 129 and 179, and they complement the adhesion to the external devices.

The storage overpass 84 crosses over the gate line 121, and it is connected to the exposed portion of the storage electrode line 131 and the exposed projection of the first storage electrode 133a respectively through the contact holes 183 and 184 which are opposite each other with respect to the gate line 121. The storage overpass 84 overlaps the metal piece 172 and it may be electrically connected to the metal piece 172. The storage electrode line 131 including the storage electrodes 133a and 133b along with the storage overpass 84 and the metal piece 172 are used for repairing defects in the gate lines 121, the data lines 171, or the TFTs. The electrical connection between the gate line 121 and the storage electrode line 131 for repairing the gate line 121 is obtained by exposing the cross points of the gate line 121 and the storage overpass 84 by a laser beam to connect electrically the gate line 121 to the storage overpass 84. In this case, the metal piece 172 enhances the electrical connection between the gate line 121 and the storage overpass 84.

Figure 10:
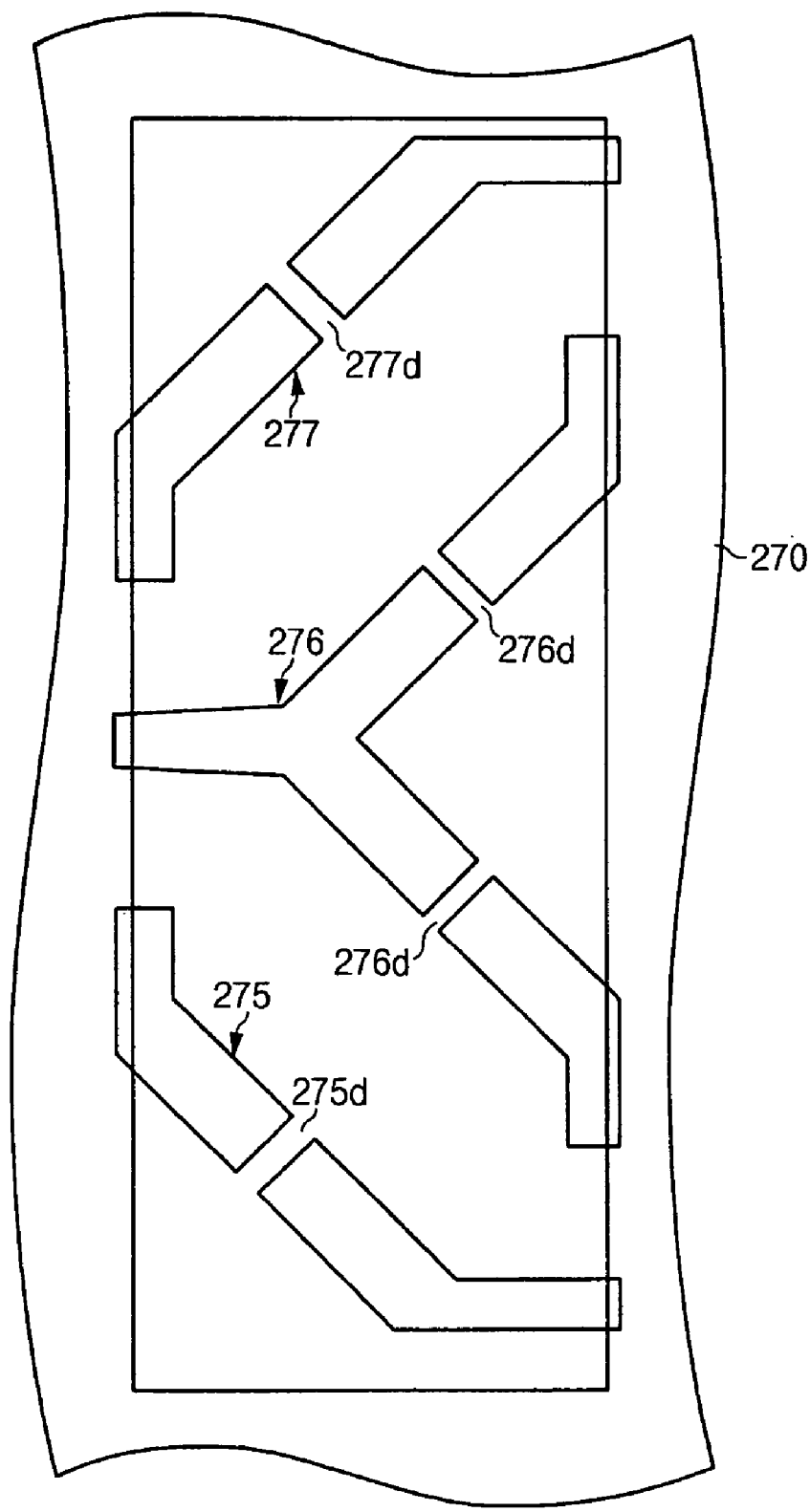
FIG. 10 is a layout view of a common electrode panel of an LCD according to another embodiment of the present invention.
Figure 11:
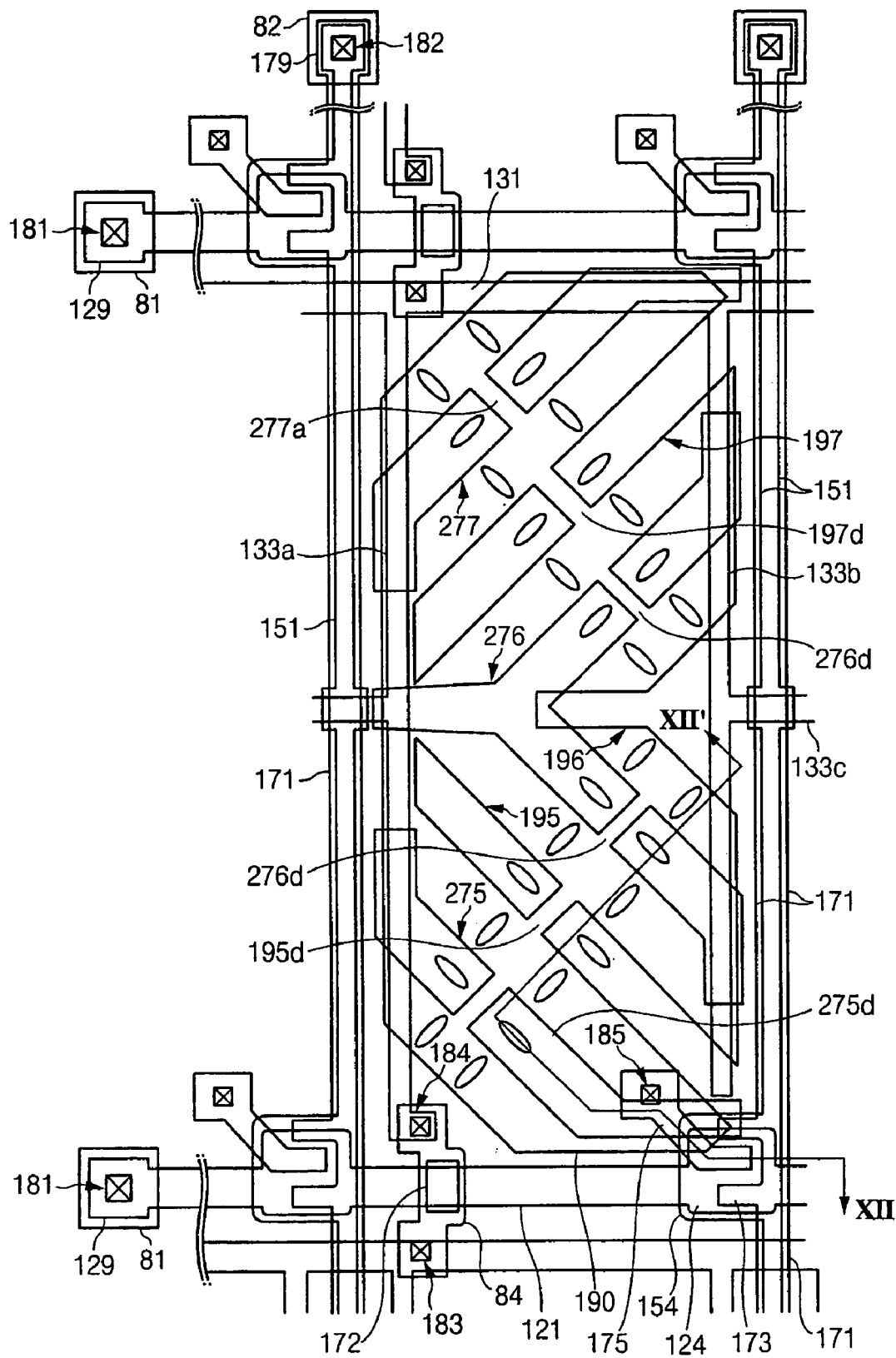
FIG. 11 is a layout view of an LCD including the TFT array panel shown in FIG. 9 and the common electrode panel shown in FIG. 10.
Figure 12:
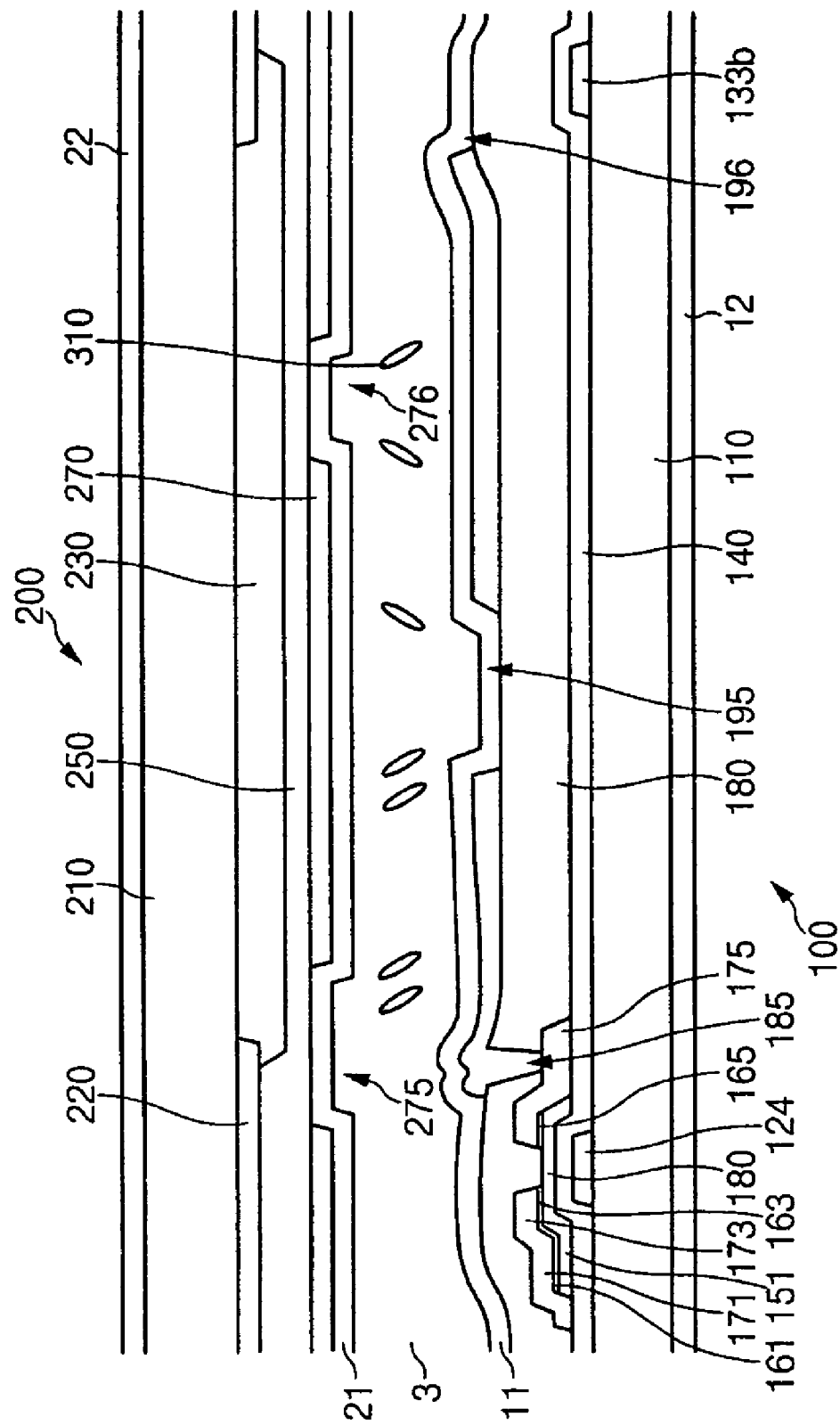
FIG. 12 is a sectional view of the LCD shown in FIG. 11 taken along the line XII-XII'.

The description of the common electrode panel 200 follows with reference to FIGS. 10, 11, and 12.

A light blocking member 220 called a black matrix for preventing light leakage is formed on an insulating substrate 210 such as transparent glass. The light blocking member 220 may include a plurality of openings that face the pixel electrodes 190 and it may have substantially the same shape as the pixel electrodes 190. Otherwise, the light blocking member 220 may include linear portions corresponding to the data lines 171 and other portions corresponding to the TFTs.

A plurality of color filters 230 are formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors.

An overcoat 250 is formed on the color filters 230.

A common electrode 270 preferably made of transparent conductive material such as ITO and IZO is formed on the overcoat 250.

The common electrode 270 has a plurality of sets of cutouts 275, 276, and 277.

The set of cutouts face a pixel electrode 190 and include a lower cutout 275, a center cutout 276, and an upper cutout 277. Each of the cutouts 275, 276, and 277 is disposed between adjacent cutouts 195, 196, and 197 of the pixel electrode 190 or between a cutout 195 or 197 and a chamfered edge of the pixel electrode 190. In addition, each of the cutouts 275, 276, and 277 has at least an oblique portion extending parallel to the lower cutout 195 or the upper cutout 197 of the pixel electrode 190. The bridges 275d, 276d, and 277d divide the cutouts as shown in FIG. 10. The bridges 275d, 276d, and 277d cross the cutouts 275, 276, and 277 perpendicularly to the cutout 275, 276, and 277 Thus each of the divided portions has two oblique major edges parallel to each other and at least a minor edge perpendicular to the major edges. The cutouts 275, 276, and 277 substantially have inversion symmetry with respect to an imaginary transverse center line.

Each of the lower and upper cutouts 275 and 277 includes an oblique portion extending approximately from a left edge of the pixel electrode 190 approximately to a lower right corner or an upper right corner of the pixel electrode 190. The extending direction depends on devices, and it may be the opposite direction. The ends of the oblique portion may extend to transverse and longitudinal direction along and overlapping edges of the pixel electrode 190, and making obtuse angles with the oblique portion.

The center cutout 276 includes a central transverse portion extending approximately from the left edge of the pixel electrode 190 along the imaginary transverse center line, a pair of oblique portions extending from an end of the central transverse portion approximately to a right edge of the pixel electrode and making obtuse angles with the central transverse portion, and a pair of terminal longitudinal portions extending from the ends of the respective oblique portions along the right edge of the pixel electrode 190, overlapping the right edge of the pixel electrode 190, and making obtuse angles with the respective oblique portions.

The number of the cutouts depends on the design factors. The light blocking member 220 may overlap a portion of the cutouts 275, 276, and 277 to block the light leakage through the cutouts.

Homeotropic alignment layers 11 and 21 are coated on inner surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include one retardation film for compensating the retardation of the LC layer 3.

The LC molecules 310 in the LC layer 3 are aligned such that their long axes are vertical to the surfaces of the panels 100 and 200. The liquid crystal layer 3 has negative dielectric anisotropy.

The cutouts 195, 196, 197, 275, 276, and 277 control the tilt directions of the LC molecules in the LC layer 3. The liquid crystal molecules defined by adjacent cutouts and chamfered edges are tilted in a direction perpendicular to the extension direction of the cutouts and the chamfered edges, which is called domains. It is apparent that the domains have two long edges extending substantially parallel to each other and making an angle of about 45 degrees with the gate line 121.

The width of the cutouts 195, 196, 197, 275, 276, and 277 is preferably in a range between about seven microns and about twenty microns.

At least one of the cutouts 195, 196, 197, 275, 276, and 277 can be substituted with protrusions (not shown) or depressions (not shown). The protrusions are preferably made of organic or inorganic material and disposed on or under the field-generating electrodes 190 or 270 and have a width smaller than the cutouts.

The shapes and the arrangements of the cutouts 195, 196, 197, 275, 276, and 277 may be modified.

An LCD according to another embodiment of the present invention will be described in detail with reference to FIGS. 13 and 14.

Figure 13:
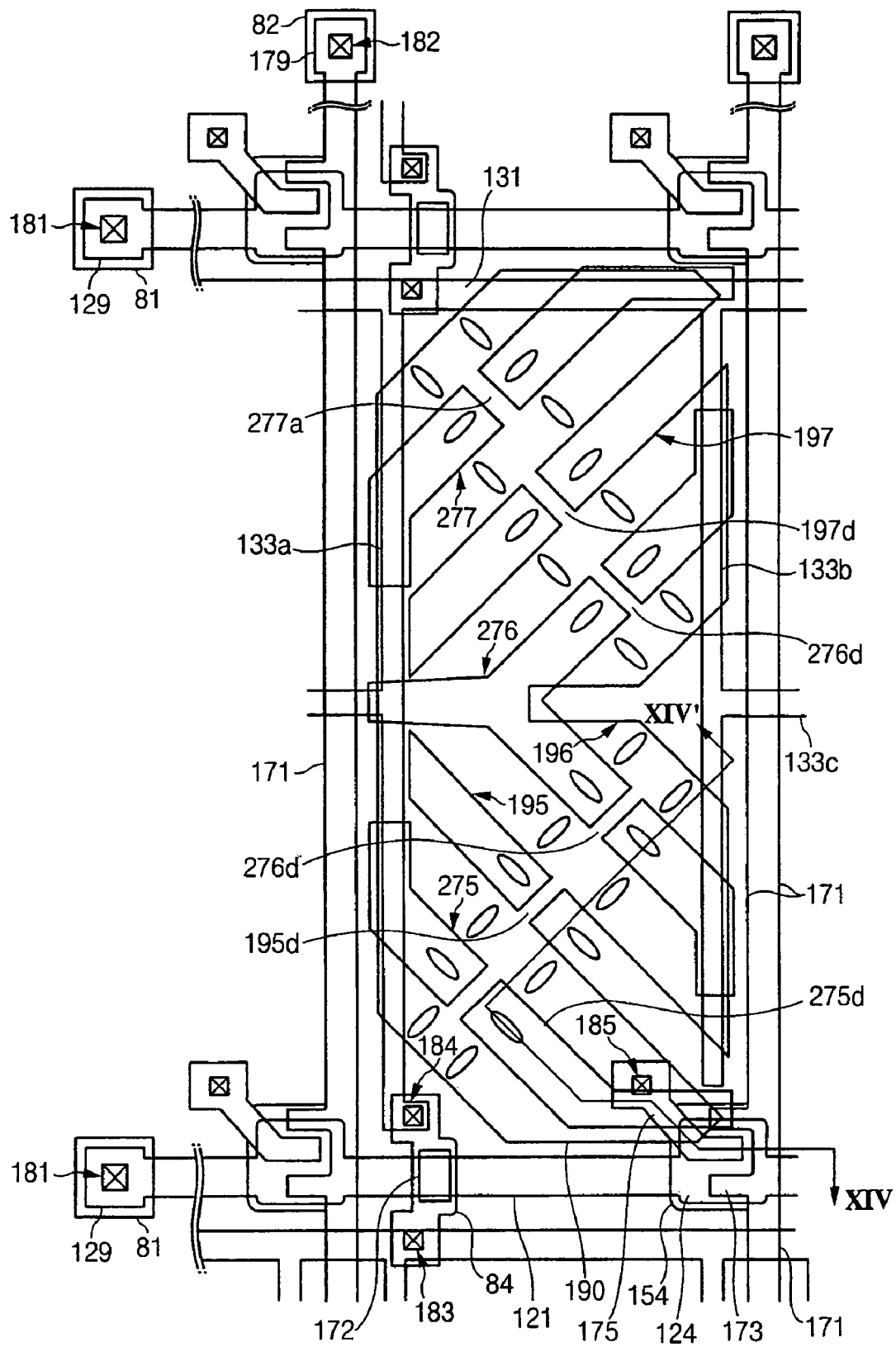
FIG. 13 is a layout view of an LCD according to another embodiment of the present invention.
Figure 14:
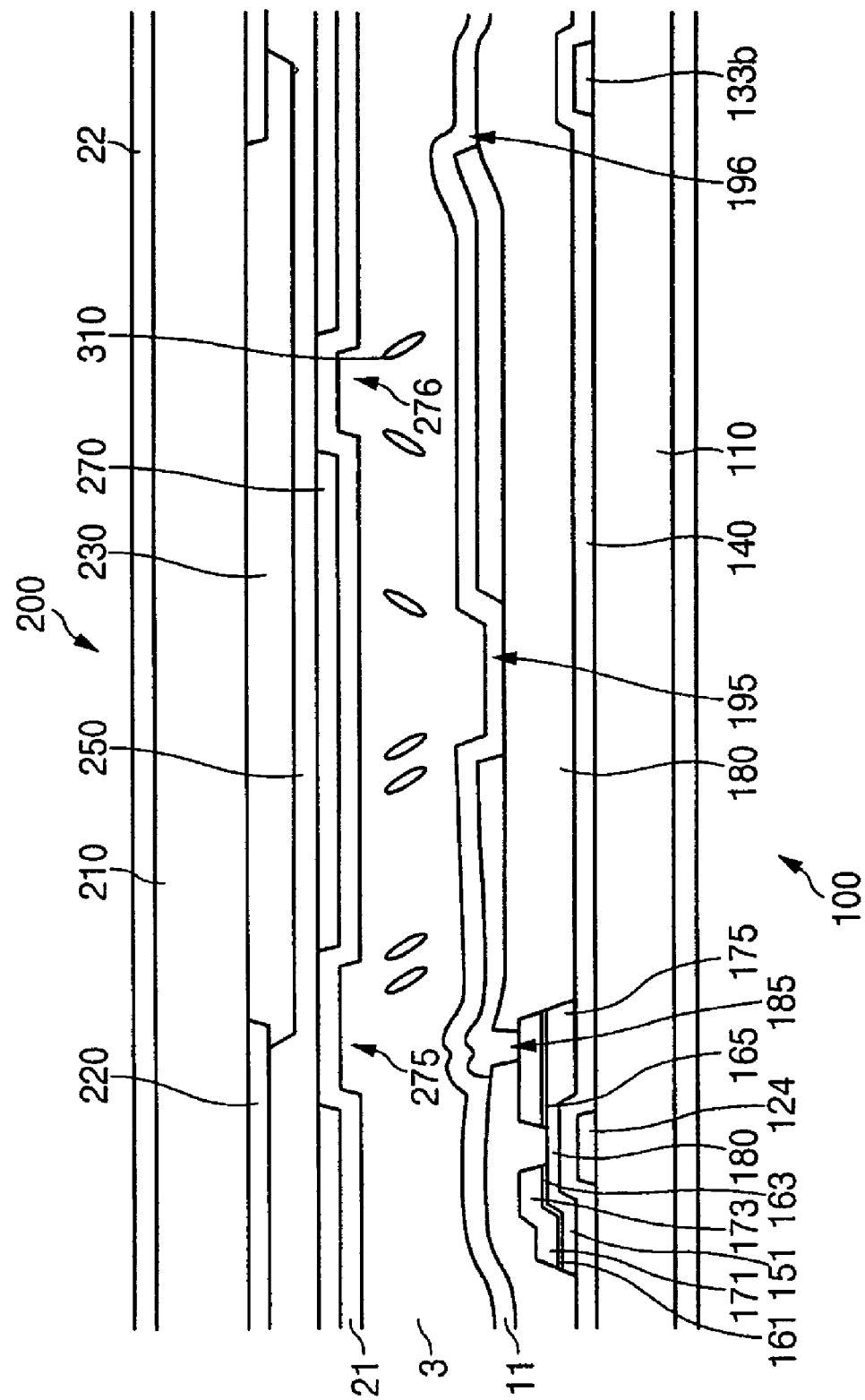
FIG. 14 is a sectional view of the LCD shown in FIG. 13 taken along the line XIV-XIV'.

Referring to FIGS. 13 and 14, an LCD according to this embodiment also includes a TFT array panel 100, a common electrode panel 200, and a LC layer 3 interposed therebetween.

Layered structures of the panels 100 and 200 according to this embodiment are almost the same as those shown in FIGS. 9, 10, 11, and 12.

Regarding the TFT array panel 100, a plurality of gate lines 121 including a plurality of gate electrodes 124 and a plurality of storage electrode lines 131 including a plurality of storage electrodes 133a and 133b and storage connections 133c are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173, a plurality of drain electrodes 175, and a plurality of isolated metal pieces 172 are formed on the ohmic contacts 161 and 165, and a passivation layer 180 is formed thereon. A plurality of contact holes 181, 182, 183, 184, and 185 are provided at the passivation layer 180 and the gate insulating layer 140. A plurality of pixel electrodes 190 having cutouts 195, 196, and 197 divided by bridges 195d, 196d, and 197d, a plurality of storage overpasses 84, and a plurality of contact assistants 81 and 82 are formed on the passivation layer 180. An alignment layer 11 is coated thereon.

Regarding the common electrode panel 200, a light blocking member 220, a plurality of color filters 230, an overcoat 250, a common electrode 270 having cutouts 275, 276, and 277 divided by bridges 275d, 276d, and 277d, and an alignment layer 21 are formed on an insulating substrate 210.

Different from the LCD shown in FIGS. 9, 10, 11, and 12, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Many of the above-described features of the LCD shown in FIGS. 9, 10, 11, and 12 may be appropriate to the LCD shown in FIGS. 13 and 14.

Now, experiments on an LCD according to an embodiment of the present invention will be described in detail with reference to FIGS. 15, 16, 17, and 18.

Figure 15:
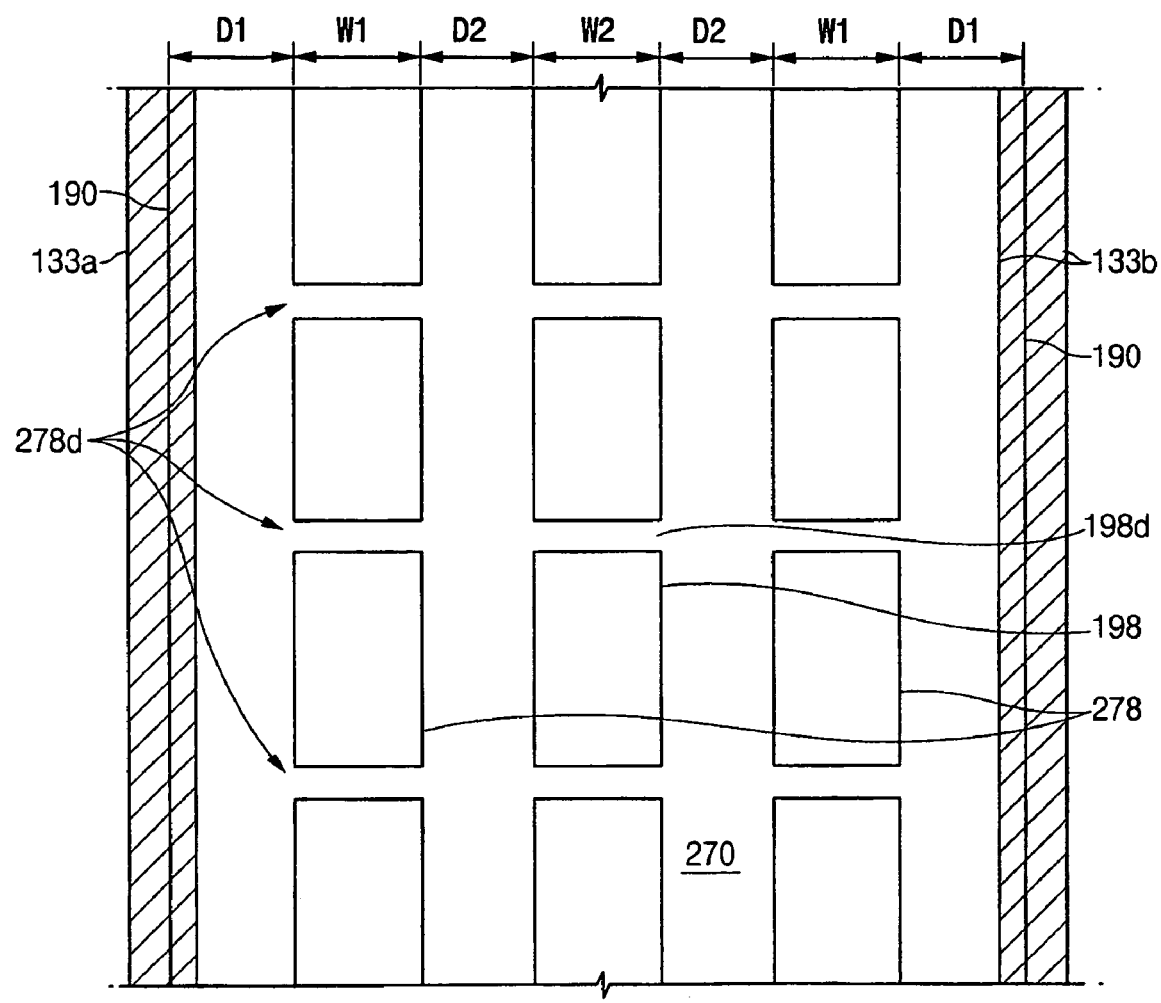
FIG. 15 is a layout view illustrating an arrangement of cutouts of a pixel electrode and a common electrode of the LCD shown in FIGS. 1, 2, 3, 4, and 5.
Figure 16:
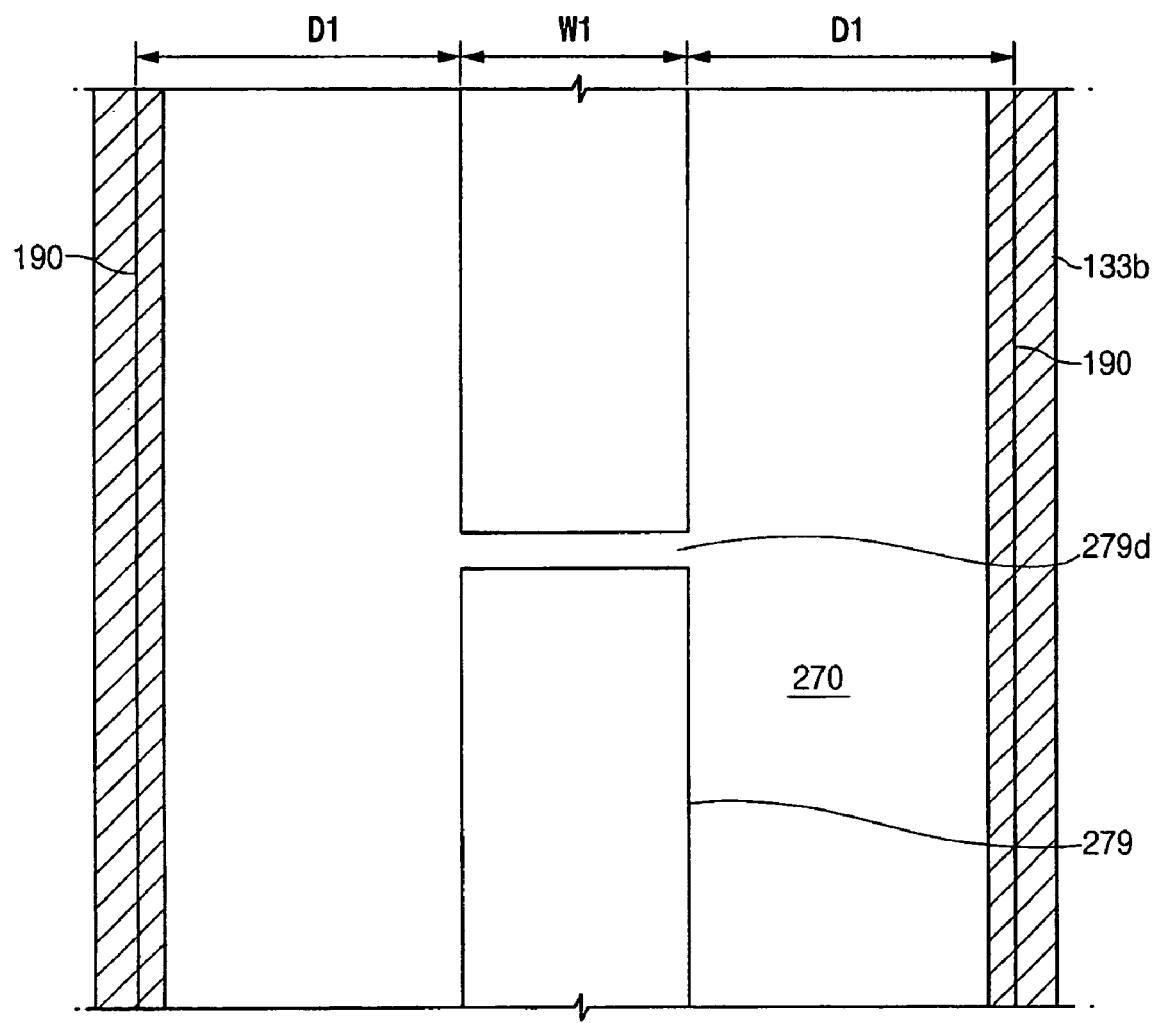
FIG. 16 is a layout view illustrating an arrangement of a cutout of a common electrode of an LCD that has substantially the same configuration as that shown in FIGS. 1, 2, 3, 4, and 5 except for cutouts.

As shown in FIGS. 15 and 16, a pixel electrode 190 overlaps a pair of storage electrodes 133a and 133b at its left and right edges.

Referring to FIG. 15, the pixel electrode 190 has a cutout 198 bisecting the pixel electrode 190 into left and right parts and the pixel electrode 190 includes a plurality of bridges 198d crossing the cutout 198. A common electrode 270 has a pair of cutouts 278 bisecting the left and right parts of the pixel electrode 190. The common electrode 270 includes a plurality of bridges 278d crossing the cutouts 278. The number of the bridges 198d and 278d crossing each of the cutouts 198 and 278 is three.

Referring to FIG. 16, the pixel electrode 190 has no cutout. A common electrode 270 has a cutout 279 bisecting the pixel electrode 190 into left and right halves and the common electrode 270 includes one bridge 279d crossing the cutout 279.

In FIGS. 15 and 16, D1 indicates a distance between an edge of the pixel electrode 190 and an edge of the cutouts 198, 278 and 279 adjacent thereto, D2 indicates a distance between adjacent edges of adjacent cutouts 198 and 278, W1 indicates a width of the cutouts 278 and 279 of the common electrode 270, and W2 indicates a width of the cutout 198 of the pixel electrode 190.

The width of the pixel electrode 190 was 55 microns and the overlapping width of the pixel electrode 190 with each of the storage electrodes 133a and 133b was 2 microns such that the non-overlapping width of the pixel electrode 190 was 51 microns.

Figures 17, 18:
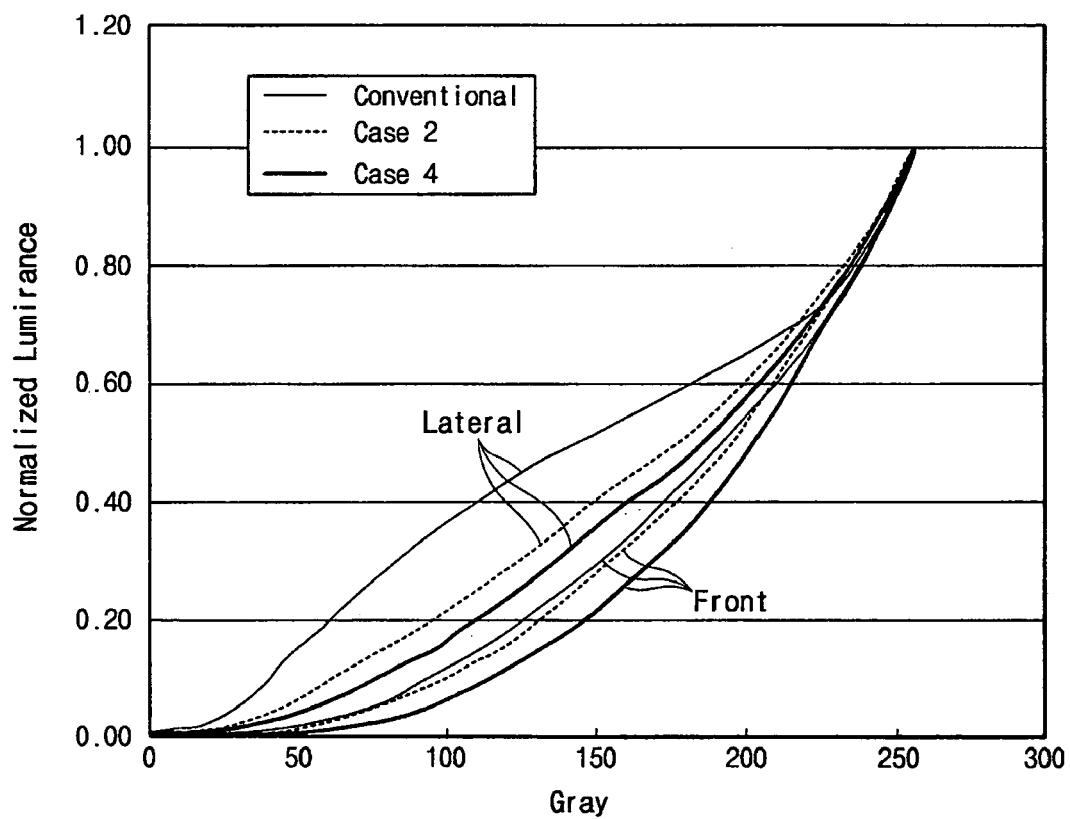
FIG. 17 is a table illustrating various experimental conditions of width and distance of the cutouts shown in FIGS. 15 and 16.
FIG. 18 is a graph illustrating gamma curves for the cases illustrated in FIGS. 15, 16, and 17.

FIG. 15 shows Cases 1, 2, and 3 in FIG. 17. FIG. 16 shows Case 4 in FIG. 17. The distances D1 and D2 and the widths W1 and W2 are shown in FIG. 17.

FIG. 18 shows some of the normalized luminance in front and lateral views. FIG. 18 also shows gamma curves for a conventional LCD having a cutout, but no bridge. The cutout of the conventional LCD was provided at a common electrode and had a width of 10-11 microns.

Referring to FIG. 18, the lateral gamma curve for the conventional LCD is remarkably different from the front gamma curve. However, the gamma curves in front and lateral views for Cases 2 and 4 approach each other.

As described above, the bridges enable to control the tilt of the liquid crystal molecules on the cutouts and to realize different transmittances in a pixel area, thereby improving visibility and luminance.

While the present invention has been described in detail with reference to the preferred embodiments, those skilled in the art will appreciate that various modifications and substitutions can be made thereto without departing from the spirit and scope of the present invention as set forth in the appended claims.

What is claimed is:
1. A liquid crystal display comprising:
   a first panel including a first signal line, a second signal lines intersecting the first signal line, a thin film transistor connected to the first and the second signal lines, and a pixel electrode connected to the thin film transistor;
   a second panel including a common electrode facing the pixel electrode; and
   a vertically aligned liquid crystal layer that is interposed between the pixel electrode and the common electrode;
   wherein at least one of the first and the second panels further comprise at least one tilt direction defining member having a singularity,
   wherein the liquid crystal layer comprises a first region corresponding to the tilt direction defining member and a second region disposed outside the at least one tilt direction defining member; and
   wherein the first and second secondary regions having different light transmittance upon application of an electric field.

2. The liquid crystal display of claim 1, wherein the at least one tilt direction defining member comprises a cutout or a protrusion formed at the pixel electrode or the common electrode.

3. The liquid crystal display of claim 2, wherein the singularity comprises a concavity, a convexity, or a disconnection provided at the cutout or the protrusion.

4. The liquid crystal display of claim 3, wherein the singularity comprises a concave notch provided si the cutout or the protrusion.

5. The liquid crystal display of claim 1, wherein the at least one tilt direction defining members comprise first and second tilt direction defining members having singularities, respectively, and the first and the second tilt direction defining members are alternately arranged.

6. The liquid crystal display of claim 5, wherein each of the first and the second tilt direction defining members comprises a cutout formed at the pixel electrode or the common electrode, or a protrusion formed on the pixel electrode or the common electrode.

7. The liquid crystal display of claim 1, wherein the transmittance of the first region is higher than about 50% and lower than about 100% of the transmittance of the second region.

8. The liquid crystal display of claim 1, wherein the first region has a planar area equal to or less than a planar area of the second region and higher than about 40% of the planar area of the second region.

9. The liquid crystal display of claim 1, wherein the tilt directions of liquid crystal molecules in the first and the second regions are different.

10. A liquid crystal display comprising:
a first panel including a first signal line, a second signal line intersecting the first signal line, a thin film transistor connected to the first and the second signal lines, and a pixel electrode connected to the thin film transistor;
a second panel including a common electrode facing the pixel electrode; and
a vertically aligned liquid crystal layer that is interposed between the pixel electrode and the common electrode;
wherein the second signal line comprises oblique portions and a longitudinal portion;
wherein the pixel electrode includes at least one edge substantially parallel to the oblique portions of the second signal line;
wherein the liquid crystal layer includes first and a second regions having different tilt angles upon application of an electric field, and
wherein at least one of the first and the second panels further includes a tilt direction defining member having a singularity.

11. The liquid crystal display of claim 10 wherein the first region faces the tilt direction defining member.

12. The liquid crystal display of claim 10 wherein the tilt direction defining member comprises a cutout or a protrusion formed at the pixel electrode or the common electrode.

13. The liquid crystal display of claim 12 wherein the singularity comprises a concavity, a convexity, or a disconnection provided at the cutout or the protrusion.

14. The liquid crystal display of claim 10, wherein the first region has a light transmittance higher than about 50% and lower than about 100% of a light transmittance of the second region.

15. The liquid crystal display of claim 10, wherein the first region has a planar area equal to or less than a planar area of the second region and higher than about 40% of the planar area of the second region.

16. The liquid crystal display of claim 2, wherein the cutout is from about 7 microns to about 20 microns wide.

17. The liquid crystal display of claim 2, wherein the protrusion is from about 6 microns to about 16 microns wide.

18. The liquid crystal display of claim 1, wherein the at least one tilt direction member determines a tilt direction of liquid crystal molecules in the second region, and the singularity determines a tilt direction of liquid crystal molecules in the first region.

* * * * *

UNITED STATES PATENT AND TRADEMARK OFFICE
CERTIFICATE OF CORRECTION

PATENT NO. : 7,420,639 B2
APPLICATION NO. : 11/043175
DATED : September 2, 2008
INVENTOR(S) : Hee-Joon Kim et al.

Page 1 of 1

It is certified that error appears in the above-identified patent and that said Letters Patent is hereby corrected as shown below:

Col. 16, lines 47-67, Claim 1 should read as follows:

1. A liquid crystal display comprising:
   a first panel including a first signal line, a second signal lines intersecting the first signal line, a thin film transistor connected to the first and the second signal lines, and a pixel electrode connected to the thin film transistor;
   a second panel including a common electrode facing the pixel electrode; and
   a vertically aligned liquid crystal layer that is interposed between the pixel electrode and the common electrode;
   wherein at least one of the first and the second panels further comprise at least one tilt direction defining member having a singularity,
   wherein the liquid crystal layer comprises a first region corresponding to the tilt direction defining member and a second region disposed outside the at least one tilt direction defining member; and
   wherein the first and second regions having different light transmittance upon application of an electric field.

Signed and Sealed this
Twenty-sixth Day of April, 2011

David J. Kappos
*Director of the United States Patent and Trademark Office*